(12) United States Patent
Waltz (10) Patent No.: US 11,002,350 B2
(45) Date of Patent: May 11, 2021

(54) AXLE ASSEMBLY

(71) Applicant: DANA HEAVY VEHICLE SYSTEMS GROUP, LLC, Maumee, OH (US)

(72) Inventor: William F. Waltz, Toledo, OH (US)

(73) Assignee: DANA HEAVY VEHICLE SYSTEMS GROUP, LLC, Maumee, OH (US)

( * ) Notice: Subject to any disclaimer, the term of this patent is extended or adjusted under 35 U.S.C. 154(b) by 0 days.

(21) Appl. No.: 16/500,836

(22) PCT Filed: Jun. 1, 2018

(86) PCT No.: PCT/US2018/035593
§ 371 (c)(1),
(2) Date: Oct. 4, 2019

(87) PCT Pub. No.: WO2018/222988
PCT Pub. Date: Dec. 6, 2018

(65) Prior Publication Data
US 2020/0096083 A1 Mar. 26, 2020

Related U.S. Application Data

(60) Provisional application No. 62/514,078, filed on Jun. 2, 2017.

(51) Int. Cl.
| | |
|---|---|
| *B60K 1/02* | (2006.01) |
| *F16H 37/04* | (2006.01) |
| *B60K 1/00* | (2006.01) |
| *B60K 17/08* | (2006.01) |
| *F16H 3/62* | (2006.01) |

(52) U.S. Cl.
CPC ............. *F16H 37/042* (2013.01); *B60K 1/00* (2013.01); *B60K 1/02* (2013.01); *B60K 17/08* (2013.01); *F16H 3/62* (2013.01); *B60K 2001/001* (2013.01); *F16H 2200/0034* (2013.01);
(Continued)

(58) Field of Classification Search
CPC .. F16H 37/042; F16H 3/62; F16H 2200/0034; F16H 2200/2007; F16H 2200/2035; F16H 2200/2094; F16H 3/66; F16H 2200/2064; B60K 1/00; B60K 1/02; B60K 17/08; B60K 2001/001; B60Y 2400/73
See application file for complete search history.

(56) References Cited

U.S. PATENT DOCUMENTS

| | | | | |
|---|---|---|---|---|
| 8,663,051 | B2 * | 3/2014 | Sten | F16H 48/36 475/205 |
| 2013/0274052 | A1 * | 10/2013 | Kalmbach | B60K 1/00 475/150 |
| 2016/0377157 | A1 * | 12/2016 | Hart | B60K 17/08 475/205 |

* cited by examiner

*Primary Examiner* — Justin Holmes
(74) *Attorney, Agent, or Firm* — McCoy Russell LLP

(57) ABSTRACT

An axle assembly may have at least one electric motor/generator. The motor/generator may be connected to a first sun gear. A first gear of a first planet carrier may be meshed with the first sun gear. A first ring gear may be meshed with a second gear of the first planet carrier. A second ring gear, a second sun gear and a second planet carrier may be provided. A selector sleeve may selectively connect a selector spline connected to the first ring gear and a ground for a low output speed, the selector sleeve may selectively connect the first and second ring gears with the first planet carrier for a high output speed and selector sleeve selectively connect to only the first ring gear for neutral.

14 Claims, 3 Drawing Sheets

(52) U.S. Cl.
CPC ............... *F16H 2200/2007* (2013.01); *F16H 2200/2035* (2013.01); *F16H 2200/2094* (2013.01)

AXLE ASSEMBLY

BACKGROUND

Hybrid vehicles are enjoying increased popularity and acceptance due in large part to the cost of fuel and greenhouse carbon emission government regulations for internal combustion engine vehicles. Such hybrid vehicles include both an internal combustion engine as well as an electric motor to propel the vehicle.

Hybridization extends to commercial vehicles as well. A typical six-wheel arrangement for a commercial vehicle includes an axle having steerable wheels at the front end of the vehicle and tandem axles at the rear of the vehicle. Commercial vehicles having two or more rear axles (i.e., tandem axles) allow such vehicles to carry greater loads when compared to vehicles and trailers having a single axle.

Traditional tandem axle drivelines include 6×4 drivelines (i.e., 2 wheels on the steer axle and 4 driving wheels on tandem axles behind the steer axle) or 6×2 drivelines (i.e., 2 wheels on the steer axle and 4 wheels on the tandem axles behind the steer axle where only two wheels are on a drive axle). Any axle in the tandem axles may be a drive axle or a dead axle. When an additional axle (secondary axle) is a dead axle, it may be positioned before (a pusher axle) or after (a tag axle) a drive axle.

It may be useful and advantageous to have an electric tag or pusher axle that can provide high torque for selective use to get the vehicle moving, any time when additional power is needed, or when there is a loss of traction. The electric tag or pusher axle may then turn off, or reduce power, to save electric power and/or when supplemental power is no longer needed. An electric tag or pusher axle may also advantageously provide energy harvesting/energy recuperation abilities.

SUMMARY

An axle assembly may have at least one electric motor/generator connected to a rotatable first shaft with a first gear mounted thereon. A second, shaft with a second gear mounted thereon may also be provided. The first gear and the second gear may be meshed to create a gear reduction pass. A first sun gear may be located on an inboard end portion the second shaft. A first gear of a first planet carrier may be meshed with the first sun gear. A first ring gear may be meshed with a second gear of the first planet carrier. The first sun gear, the first planet carrier and the first ring gear may form a first planetary gear set. A second planetary gear set may be connected between the first planetary gear set and a differential. A second planetary gear set may have a second ring gear, a second sun gear and a second planet carrier. A selector sleeve may selectively connect a selector spline connected to the first ring gear a ground for a low output speed, or low mode. The selector sleeve may selectively connect the first and second ring gears with the first planet carrier and second sun gear for a high output speed, or high mode, and the selector sleeve not connected for neutral.

In another aspect of the axle assembly, the second sun gear may be connected to the first planet carrier.

In another aspect of the axle assembly, the second planet carrier may have a first gear meshed with the second sun gear.

In another aspect of the axle assembly, the second ring gear may be meshed with a second gear of the second planet carrier.

In another aspect of the axle assembly, the differential may be connected to the second planet carrier.

In another aspect of the axle assembly, the differential is connected to the second ring gear.

In another aspect of the axle assembly, the second shaft may be a hollow shaft and a third shaft is located within the second shaft. An inboard end portion of the third shaft may be directly driven by the differential and an outboard end portion of the third shaft may be directly connected to an axle disconnect clutch.

In another aspect of the axle assembly, the first ring gear and the second ring gear may be connected to the selector spline.

In another aspect of the axle assembly, the first ring gear may be connected to the second plant carrier.

DETAILED DESCRIPTION

It is to be understood that the device and/or process may assume various alternative components, orientations and configurations, except where expressly specified to the contrary. It is also understood that the specific devices and processes illustrated in the attached drawings, and described in the specification are simply exemplary embodiments of the concepts disclosed and defined herein. Therefore, specific dimensions, directions or other physical characteristics relating to the various embodiments disclosed are not to be considered as limiting, unless expressly stated otherwise.

Provided herein are exemplary embodiments of an electric axle assembly for a secondary or tag axle having a low mode/speed, a high mode/speed and a neutral position.

In low mode, the assembly has a high numeric gear ratio to provide a high torque axle ratio for launch and enhanced towing ability. In high mode, the assembly has a low numeric gear ratio to provide supplemental torque. Both modes may provide energy harvesting/energy recuperation when regenerative braking. In neutral the assembly reverts back to an unpowered tag or pusher axle.

A single electric motor/generator can be used, or two electric motors can be connected in series to provide torque. One or both of the electric motors/generators can operate as a motor when the operator of the vehicle depresses the accelerator pedal or when the operator selects the low mode/gear position. Alternatively, the electric motors can be operated by an automated system that senses loss of traction during operation, or senses additional power demand to supplement the main power source in both low and high modes. The electric motors/generators can function as a generator when the operator of the vehicle depresses the brake pedal (i.e. regenerative braking), or when the operator releases the accelerator pedal. Alternatively, an automated system can be used when optimal or near optimal conditions for regeneration exist such as down-hill cruising or during open road cruising speed coasting events when the operator releases the accelerator pedal. The motor/generators can be connected to one or more batteries. One motor/generator can be used as a motor while the other motor/generator can be use as a generator.

The preferred embodiments will now be described with reference to the accompanying figures. The terminology used in the descriptions below is not to be interpreted in any limited or restrictive manner simply because it is used in conjunction with detailed descriptions of certain specific embodiments.

In the following embodiments of a two-speed secondary electric axle assembly described below, two electric motors/generators connected in series are shown but it is understood that a single motor/generator may be used depending on the torque output desired. Also in all the embodiments, the output of motors/generators are connected to a single gear pass but it is understood that additional gear passes can be used depending on the desired gear ratio that is to be obtained. All of the embodiments also show two planetary gear sets but fewer or additional planetary gear sets may be used depending on the desire gear ratio. In addition, the number of planet gears included in the planetary gear set can vary as needed. Compound planetary gears can be utilized and the order of the gears and planetaries can be rearranged. A single brake to ground and a single clutch is shown in all the embodiments but additional brakes and/or clutches can be used. Clutches can be selected from but not limited to wet or dry clutch, cone, dog, and centrifugal clutch. The brake could be selected from but not limited to a wet or dry clutch, cone, dog, or band clutch.

Figure 1:
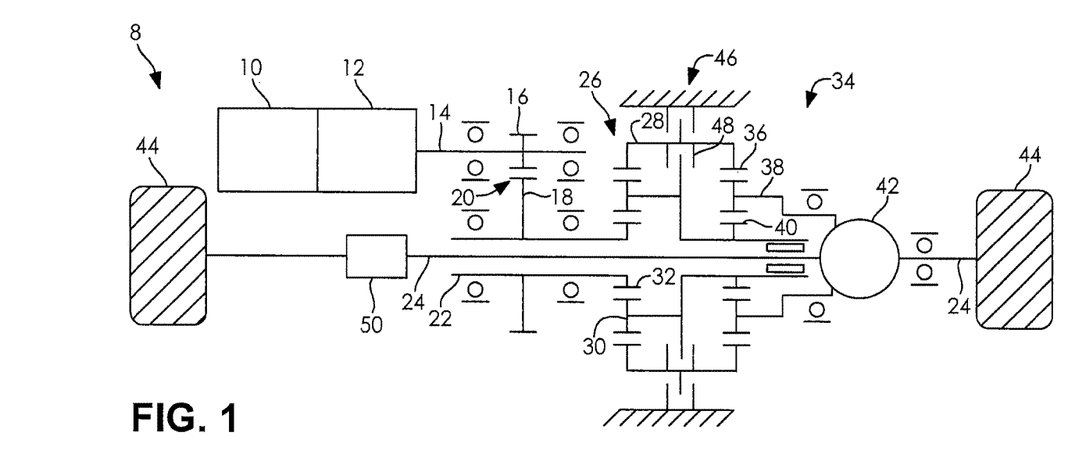
FIG. 1 is a schematic view of one embodiment of an axle assembly.

Referring to the embodiment shown on FIG. 1, an electric axle assembly 8 can include two electric motors/generators 10, 12 drivingly connected to a rotatable first shaft 14. First shaft 14 has a first gear 16 rotatably mounted thereon. First gear 16 engages with a gear 18 to form a gear pass 20. Second gear 18 is rotatably mounted on a second shaft 22. Second shaft 22 is a hollow shaft co-axial with a third shaft 24. In some embodiments of the electric axle assembly 8, a first planetary gear set 26 has a first ring gear 28, a first planet carrier 30, and a first sun gear 32, and a second planetary gear set 34 has a second ring gear 36, a second planet carrier 38, and a second sun gear 40. The first sun gear 32 of the first planetary gear set 26 is rotatably mounted to the second shaft 22. The first sun gear 32 engages the first planet carrier 30, such as through one or more gears on the first planet carrier 30 meshing with the first sun gear 32. The one or more gears of first planet carrier 30 engages the first ring gear 28. The first planet carrier 30 is rotatably mounted to the second sun gear 40. The first ring gear 28 is rotatably mounted to the second ring gear 36. The second sun gear 40 engages the second planet carrier 38, such as through one or more gears on the second planet carrier 38 meshing with the second sun gear 40. The one or more gears of second planet carrier 38 engages the second ring gear 36. Output from the second planet carrier 38 is drivingly connected to a differential 42. The differential 42 can be, but is not limited to, a standard bevel gear differential. The differential 42 is drivingly connected to the third shafts 24 to transmit power to wheels 44 connected at each end of the third shafts 24. An optional axle disconnect 50 is rotatably mounted to one third shaft 24 between the differential 42 and the wheel 44.

To operate the assembly 8 shown in FIG. 1 in low mode/speed, brake 46 can operably couple both the first and second ring gears 28, 36 to ground. This permits torque to flow through the first sun gear 32 to the first planet carrier 30 to the second sun gear 40 to the second planet carrier 38 to the differential 42. To operate the assembly 8 in high mode/speed, clutch 48 can operably couple both the first and second ring gears 28, 36 to both the first planet carrier 30 and the second sun gear 40. When neither brake 46 nor clutch 48 is engaged, the assembly is in a neutral position. In some embodiments, a clutch can be used instead of brake 46. The clutch can be, but is not limited to, a band clutch, a dog clutch, a face clutch, a clone clutch, a wet or dry clutch including a hydraulically or pneumatically actuated wet clutch pack. In some embodiments, clutch 48 can be, but is not limited to, a dog clutch, a face clutch, a clone clutch, a wet or dry clutch including a hydraulically or pneumatically actuated wet clutch pack.

In some embodiments, gear pass 20, and the first and second planetary gear sets 26, 34 can each provide a reduction ratio for example, but is not limited to, a 4.25:1 reduction ratio, while providing the assembly 8 with a larger overall reduction for example, but not limited to, a 76:1 reduction. At certain desired road speeds, the assembly 8 can be in a neutral position wherein no power will be transferred through gear pass 20, and the planetary gear sets 26, 34 to the differential 42 and to the wheels 44 of the vehicle. The third axle shaft 24 may also be disconnected at the axle disconnect clutch 50, which may be such as any one of the above-described clutches, stopping all powertrain rotation from the second planet carrier 38 up to and including the electric motor/generator 10, 12.

Figure 2:
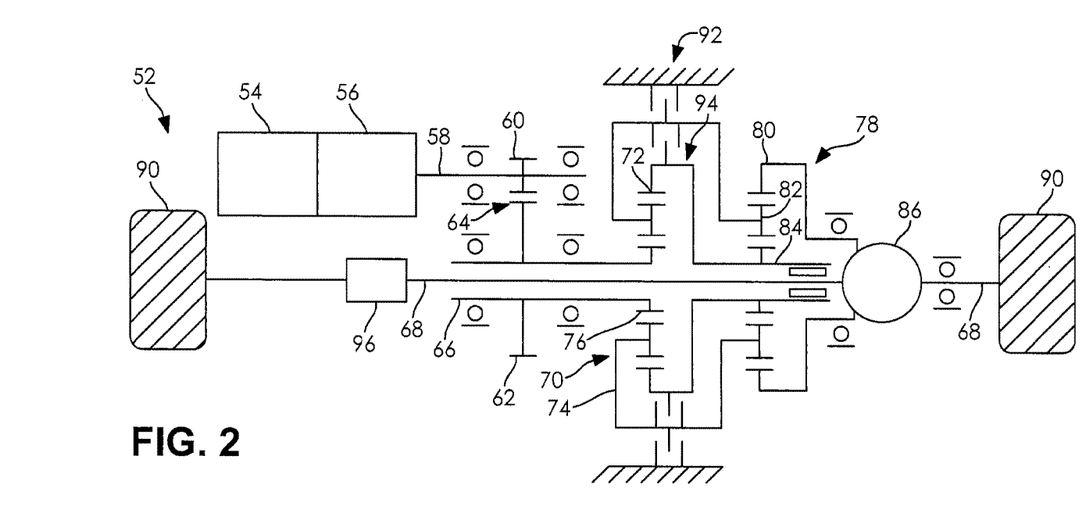
FIG. 2 is a schematic view of another embodiment of an axle assembly.

Referring to the embodiment shown in FIG. 2, an electric axle assembly 52 can include two electric motors/generators 54, 56 drivingly connected to a rotatable shaft 58. Shaft 58 has a first gear 60 rotatably mounted thereon. First gear 60 engages with a second gear 62 to form a gear pass 64. Second gear 62 is rotatably mounted on a second shaft 66. Second shaft 66 is a hollow shaft co-axial with a third shaft 68. In some embodiments of the assembly 52, a first planetary gear set 70 having a first ring gear 72, a first planet carrier 74, and a first sun gear 76, and a second planetary gear set 78 having a second ring gear 80, a second planet carrier 82, and a second sun gear 84. The first sun gear 76 of the first planetary gear set 70 is rotatably mounted to the second shaft 66. The first sun gear 76 engages the first planet carrier 74, such as through one or more gears on the first planet carrier 74 meshing with the first sun gear 76. The one or more gears of the first planet carrier 74 engages the first ring gear 72. The first planet carrier 74 is rotatably mounted to the second planet carrier 82. The first ring gear 72 is rotatably mounted to the second sun gear 84. The second sun gear 84 engages the second planet carrier gear 82, such as through one or more gears on the second planet carrier 82 meshing with the second sun gear 84. The second planet carrier gear 82 engages the second ring gear 80. Output from the second ring gear 80 is drivingly connected to a differential 86. The differential 86 can be, but is not limited to, a standard bevel gear differential. The differential is drivingly connected to the third shafts 68, such as to transmit power to wheels 90 connected at each end of the third shafts 68. An optional axle disconnect 96 which may be such as any one of the above-described clutches, is rotatably mounted to one third shaft 68 between the differential 86 and the wheel 90.

To operate the assembly 52 shown in FIG. 2 in low mode/speed, a brake 92 can operably couple both the first and second planet carriers 74, 82 to ground. To operate the assembly 52 of FIG. 2 in high mode/speed, a clutch 94 can operably couple both the first and second planet carriers 74, 82 to both the first ring gear 72 and the second sun gear 84. When neither brake 92 nor clutch 94 is engaged, the assembly 52 is in a neutral position. In some embodiments, a clutch can be used instead of the brake 92. The clutch can be, but is not limited to, a band clutch, a dog clutch, a face clutch, a clone clutch, a wet or dry clutch including a hydraulically or pneumatically actuated wet clutch pack. In some embodiments, the clutch 94 can be, but is not limited to, a dog clutch, a face clutch, a clone clutch, a wet or dry clutch including a hydraulically or pneumatically actuated wet clutch pack.

In some embodiments, gear pass 64, and planetary gear sets 70, 78 can each provide a reduction ratio for example, but is not limited to, a 4.25:1 reduction ratio, while providing an assembly 52 with a larger overall reduction for example, but not limited to, a 76:1 reduction. At certain desired road speeds, the assembly can be in a neutral position wherein no power will be transferred through gear pass 64, and planetary gear sets 70, 78 to the differential 86 and to the wheels 90 of the vehicle. The third axle shaft 68 may also be disconnected at the axle disconnect clutch 96 stopping all powertrain rotation from the second ring gear 80 up to and including the electric motor/generator 54, 56.

Figure 3:
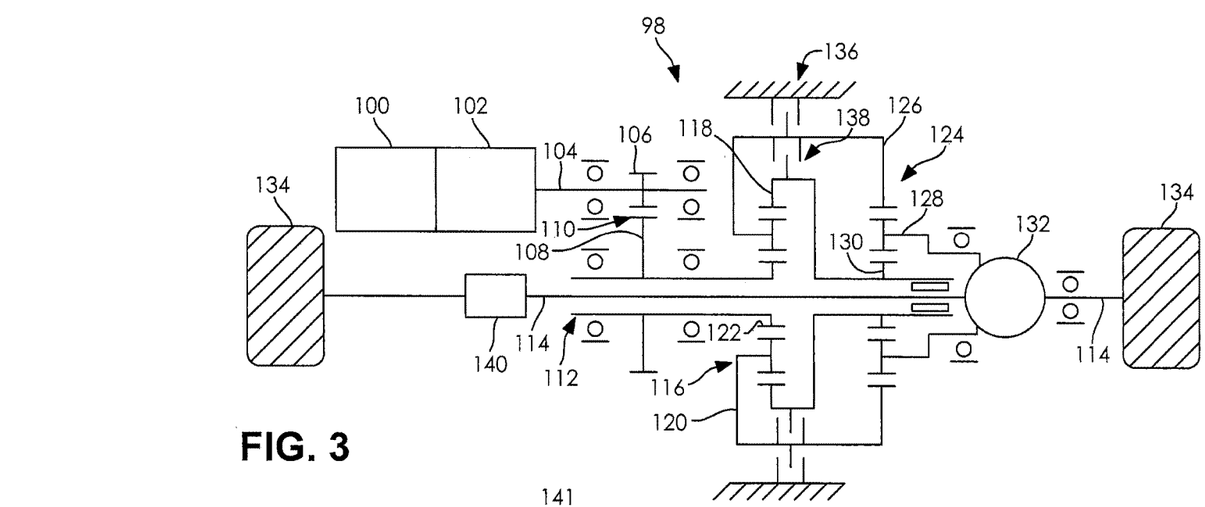
FIG. 3 is a schematic view of yet another embodiment of an axle assembly.

Referring to the embodiment shown in FIG. 3, an electric axle assembly 98 can include two electric motors/generators 100, 102 drivingly connected to a rotatable first shaft 104. The first shaft 104 has a first gear 106 rotatably mounted thereon. The first gear 106 engages with a second gear 108 to form a gear pass 110. The second gear 108 is rotatably mounted on a second shaft 112. The second shaft 112 is a hollow shaft co-axial with a third shaft 114. In some embodiments of the assembly, a first planetary gear set 116 having a first ring gear 118, a first planet carrier 120, and a first sun gear 122, and a second planetary gear set 124 having a second ring gear 126, a second planet carrier 128, and a second sun gear 130. The first sun gear 122 of the first planetary gear set 116 is rotatably mounted to shaft 112. The first sun gear 122 engages the first planet carrier 120, such as through one or more gears on the first planet carrier 120 meshing with the first sun gear 122. The one or more gears on the first planet carrier 120 engages the first ring gear 118. The first planet carrier 120 is rotatably mounted to the second ring gear 126. The first ring gear 118 is rotatably mounted to the second sun gear 130. The second sun gear 130 engages the second planet carrier 128, such as through one or more gears on the second planet carrier 128 meshing with the second sun gear 130. The one or more gears on the second planet carrier 128 engages the second ring gear 126. Output from the second planet carrier 128 is drivingly connected to a differential 132. The differential 132 can be, but is not limited to, a standard bevel gear differential. The differential 132 is drivingly connected to the third shafts 114 to transmit power to wheels 134 connected at each end of the third shafts 114. An optional axle disconnect 140, which may be such as any one of the above-described clutches, is rotatably mounted to one third shaft 114 between the differential 132 and the wheel 134.

To operate the assembly 98 shown in FIG. 3 in low mode/speed, a brake 136 can operably couple both the first planet carrier 120 and the second ring gear 126 to ground. To operate the assembly 98 of FIG. 3 in high mode/speed a clutch 138 can operably couple both the first planet carrier 120 and the second ring gear 126, to both the first ring gear 118 and the second sun gear 130. When neither the brake 136 nor the clutch 138 is engaged, the assembly 98 is in a neutral position.

In some embodiments, a clutch can be used instead of the brake 136. The clutch can be, but is not limited to, a band clutch, a dog clutch, a face clutch, a clone clutch, a wet or dry clutch including a hydraulically or pneumatically actuated wet clutch pack. In some embodiments, the clutch 138 can be, but is not limited to, a dog clutch, a face clutch, a clone clutch, a wet or dry clutch including a hydraulically or pneumatically actuated wet clutch pack.

In some embodiments, gear pass 110, and planetary gear sets 116, 124 can each provide a reduction ratio for example, but is not limited to, a 4.25:1 reduction ratio, while providing the assembly 98 with a larger overall reduction for example, but not limited to, a 76:1 reduction. At certain desired road speeds, the assembly 98 can be in a neutral position wherein no power will be transferred through gear pass 110, and planetary gear sets 116, 124 to the differential 132 and to the wheels 134 of the vehicle. The third shaft 114 may also be disconnected at the axle disconnect clutch 140 stopping all powertrain rotation from the second planet carrier 128 up to and including the electric motor/generator 100, 102.

Figure 4:
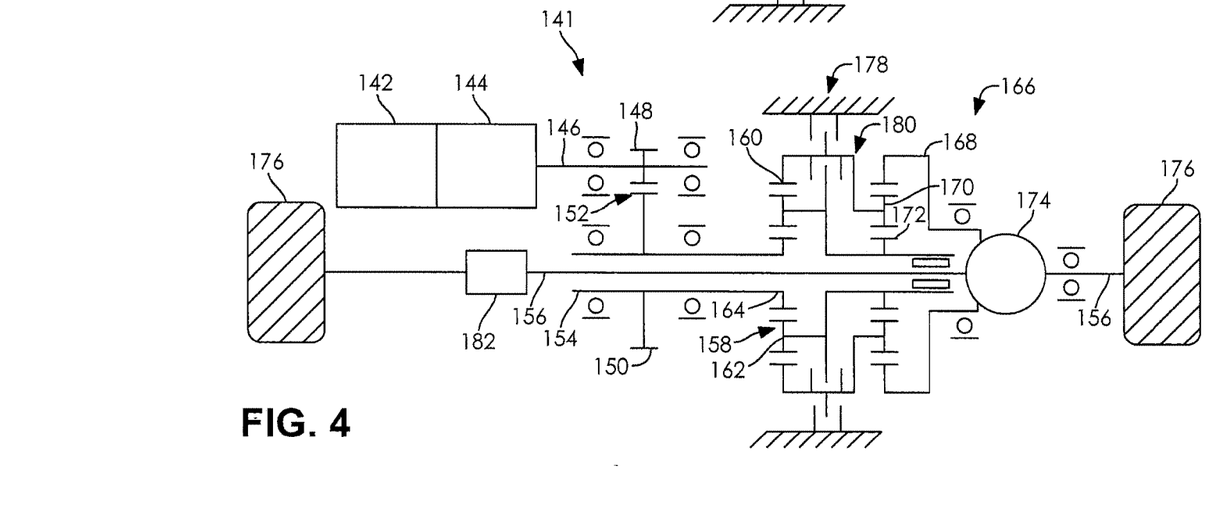
FIG. 4 is a schematic view of yet another embodiment of an axle assembly.

Referring to the embodiment shown in FIG. 4, an electric axle assembly 141 can include two electric motors/generators 142, 144 drivingly connected to a rotatable shaft 146. The first shaft 146 has a first gear 148 rotatably mounted thereon. The first gear 148 engages with a second gear 150 to form a gear pass 152. The second gear 150 is rotatably mounted on a second shaft 154. The shaft 154 is a hollow shaft co-axial with a third shaft 156. In some embodiments of the assembly 141, a first planetary gear set 158 has a first ring gear 160, a first planet carrier 162, and a first sun gear 164, and a second planetary gear set 166 having a second ring gear 168, a second planet carrier 170, and a second sun gear 172. The first sun gear 164 of the first planetary gear set 158 is rotatably mounted to the second shaft 154. The first sun gear 164 engages the first planet carrier 162, such as through one or more gears on the first planet carrier 162 meshing with the first sun gear 164. The one or more gears of the first planet carrier 162 engages the first ring gear 160. The first planet carrier 162 is rotatably mounted to the second sun gear 172. The first ring gear 160 is rotatably mounted to the second planet carrier 170. The second sun gear 172 engages the second planet carrier 170, such as through one or more gears on the second planet carrier 170 meshing with the second sun gear 172. The one or more gears of the second planet carrier 170 engages the second ring gear 168. Output from the second ring gear 168 is drivingly connected to a differential 174. The differential 174 can be, but is not limited to, a standard bevel gear differential. The differential is drivingly connected to the third shafts 156 to transmit power to wheels 176 connected at each end of the third shaft 156. An optional axle disconnect 182, which may be such as any one of the above-described clutches, is rotatably mounted to one third shaft 156 between the differential 174 and the wheel 176.

To operate the assembly 141 shown in FIG. 4 in low mode/speed, a brake 178 can operably couple both the first ring gear 160 and the second planetary carrier 170 to ground. To operate the assembly 141 of FIG. 4 in high mode/speed, a clutch 180 can operably couple both the first ring gear 160 and the second planetary carrier 170 to both the first planetary carrier 162 and the second sun gear 172. When neither the brake 178 nor the clutch 180 is engaged, the assembly 141 is in a neutral position. In some embodiments, a clutch can be used instead of the brake 178. The clutch can be, but is not limited to, a band clutch, a dog clutch, a face clutch, a clone clutch, a wet or dry clutch including a hydraulically or pneumatically actuated wet clutch pack. In some embodiments, the clutch 180 can be, but is not limited to, a dog clutch, a face clutch, a clone clutch, a wet or dry clutch including a hydraulically or pneumatically actuated wet clutch pack.

In some embodiments, gear pass 152, and planetary gear sets 158, 166 can each provide a reduction ratio for example, but is not limited to, a 4.25:1 reduction ratio, while providing the assembly 141 with a larger overall reduction for example, but not limited to, a 76:1 reduction. At certain desired road speeds, the assembly 141 can be in a neutral position wherein no power will be transferred through gear pass 152, and planetary gear sets 158, 166 to the differential 174 and to the wheels 176 of the vehicle. The third axle shaft 156 may also be disconnected at the axle disconnect clutch 182 stopping all powertrain rotation from the second planet carrier 170 up to and including the electric motor/generator 142, 144.

Figure 5:
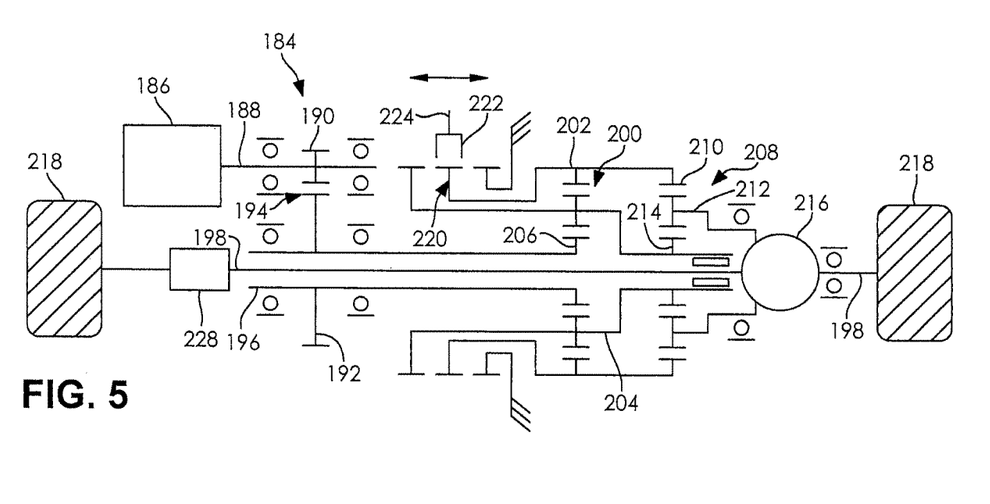
FIG. 5 is a schematic view of yet another embodiment of an axle assembly.

The embodiment of an electric axle assembly 184 shown in FIG. 5 can include one motor/generator M/G 186 drivingly connected to a rotatable shaft 188. It is understood that additional electric motors/generators can be used. The first shaft 188 has a first gear 190 rotatably mounted thereon. The first gear 190 engages, or meshes with a second gear 192 to form a gear pass 194. The second gear 192 is rotatably mounted on a second shaft 196. The second shaft 196 is a hollow shaft co-axial with a third shaft 198. In some embodiments of the electric axle assembly 184, a first planetary gear set 200 having a first ring gear 202, a first planet carrier 204, and a first sun gear 206, and a second planetary gear set 208 having a second ring gear 210, a second planet carrier 212, and a second sun gear 214. The first sun gear 206 of the first planetary gear set 200 is rotatably mounted to the second shaft 196, such as on an inboard end portion of the second shaft 196. The first sun gear 206 engages the first planet carrier 204, such as through one or more gears on the first planet carrier 204 meshing with the first sun gear 206. The one or more gears of the first planet carrier 204 engages the first ring gear 202. The first planet carrier 204 is rotatably mounted to the second sun gear 214. The first ring gear 202 is rotatably mounted to the second ring gear 210. The second sun gear 214 engages the second planet carrier 212, such as through one or more gears on the second planet carrier 212 meshing with the second sun gear 214. The one or more gears of the second planet carrier 212 engages the second ring gear 210. The second sun gear 214 is also connected to the first planet carrier 204. The second planet carrier 212 has one or more gears meshed with the second sun gear 214. Output from the second planet carrier 212 is drivingly connected to a differential 216. The differential 216 can be, but is not limited to, a standard bevel gear differential. The differential 216 is drivingly connected to the third shafts 198 to transmit power to wheels 218 connected at each end of the third shafts 198. An optional axle disconnect 228 is rotatably mounted to one third shaft 198 between the differential 216 and the wheel 218. The second planetary gear set 208 may be located between the first planetary gear set 200 and the differential 216.

In some embodiments of the electric axle assembly 184, the first ring gear 202 has a selector spline 220 rotationally attached thereto. A selector sleeve 222 slides on the selector spline 220. The selector sleeve 222 can selectively and operably couple both the first and second ring gears 202, 210 to ground for low mode/speed. In some embodiments of the electric axle assembly 184, the selector sleeve 222 can selectively and operably couple both the first and second ring gears 202, 210 to both the first planetary carrier 204 and the second sun gear 214 for high mode/speed. When neither low speed nor high speed is engaged, the selector sleeve 222 is in a neutral position, which may be such as connected to the first ring gear 202. A shift fork 224 is used to engage the selector sleeve 222. The shift fork 224 can be operated by various means including, but not limited to, mechanical, hydraulic, pneumatic etc.

In some embodiments, a clutch can be used instead of the shift fork 224 and selector sleeve 222. The clutch can be, but is not limited to, a dog clutch, a face clutch, a clone clutch, a wet or dry clutch including a hydraulically or pneumatically actuated wet clutch pack. In some embodiments, gear pass 194, and planetary gear sets 200, 208 can each provide a reduction ratio for example, but is not limited to, a 4.25:1 reduction ratio, while providing the assembly 184 with a larger overall reduction for example, but not limited to, a 76:1 reduction. At certain desired road speeds, the assembly 184 can be in a neutral position wherein no power will be transferred through gear pass 194, and planetaries gear sets 200, 208 to the differential 216 and to the wheels 218 of the vehicle. The third axle shaft 198 may also be disconnected at the axle disconnect clutch 228, which may be such as one of the above desired types of clutches, stopping all powertrain rotation from the second planet carrier 212 up to and including the electric motor/generator 186.

Figure 6:
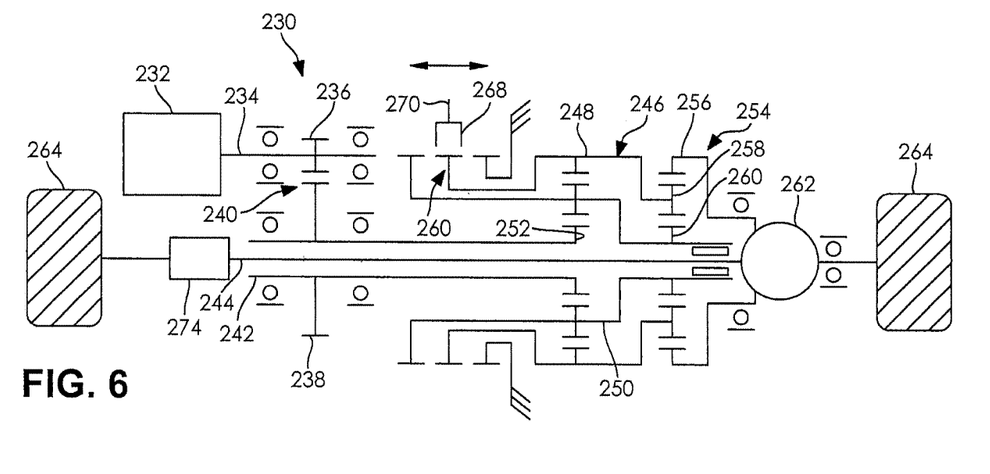
FIG. 6 is a schematic view of yet another embodiment of an axle assembly.

The electric axle assembly 230 shown in FIG. 6, can include one M/G 232 drivingly connected to a rotatable shaft 234. It is understood that additional motor/generators can be used. The first shaft 234 has a first gear 236 rotatably mounted thereon. The first gear 236 engages, or meshes with a second gear 238 to form a gear pass 240. The second gear 238 is rotatably mounted on a second shaft 242. The second shaft 242 is a hollow shaft co-axial with a third shaft 244. In some embodiments of the assembly 230, a first planetary gear set 246 having a first ring gear 248, a first planet carrier 250, and a first sun gear 252, and a second planet gear set 254 having a second ring gear 256, a second planet carrier 258, and a second sun gear 260. The first sun gear 252 of the first planetary gear set 246 is rotatably mounted to the second shaft 242. The first sun gear 252 engages the first planet carrier 250, such as through one or more gears on the first planet carrier 250 meshing with the first sun gear 252. The one or more gears of the first planet carrier 250 engages the first ring gear 248. The first planet carrier 250 is rotatably mounted to the second sun gear 260. The first ring gear 248 is rotatably mounted to the second planet carrier 258. The second sun gear 260 engages the second planet carrier 258, such as through one or more gears on the second planet carrier 258 meshing with the second sun gear 260. The second sun gear 260 engages one or more of the gears of the second planet carrier 258. The one or more gears of the second planet carrier 258 engages the second ring gear 256. The second sun gear 260 is also connected to the first planet carrier 250. The second planet carrier 258 has one or more gears meshed with the second sun gear 250. Output from the second ring gear 258 is drivingly connected to a differential 262. The differential 262 can be, but is not limited to, a standard bevel gear differential. The differential 262 is drivingly connected to the third shafts 244 to transmit power to wheels 264 connected at each end of the third shafts 244. An optional axle disconnect 274 is rotatably mounted to one third shaft 244 between the differential 262 and the wheel 264. The second planetary gear set 254 may be connected between the first planetary gear set 246 and the differential 263.

In some embodiments of the assembly 230, the first ring gear 248 has a selector spline 260 rotationally attached thereto. A selector sleeve 268 slides on the selector spline 260. The selector sleeve 268 can selectively and operably couple both the first ring gear 248 and second planet carrier 258 to ground for low mode/speed. In some embodiments of the assembly 230, the selector sleeve 268 can selectively and operably couple both the first ring gear 248 and second planet carrier 258 to both the first planet carrier 250 and the second sun gear 260 for high mode/speed. When neither low mode nor high mode is engaged, the selector sleeve 268 is in a neutral position, which may be such as connected to the first ring gear 248. A shift fork 270 is used to engage the selector sleeve 268. The shift fork 270 can be operated by various means including, but not limited to, mechanical, hydraulic, pneumatic etc.

In some embodiments, a clutch (not shown) can be used instead of the shift fork 270 and selector sleeve 268. The clutch can be, but is not limited to, a dog clutch, a face clutch, a clone clutch, a wet or dry clutch including a hydraulically or pneumatically actuated wet clutch pack. In some embodiments, gear pass 240, and planetary gear sets 246, 254 can each provide a reduction ratio for example, but is not limited to, a 4.25:1 reduction ratio, while providing the assembly 230 with a larger overall reduction for example, but not limited to, a 76:1 reduction. At certain desired road speeds, the assembly 230 can be in a neutral position wherein no power will be transferred through gear pass 240, and planetary gear sets 246, 254 to the differential 262 and to the wheels 264 of the vehicle. The third axle shaft 244 may also be disconnected at the axle disconnect clutch 274, which may be such as one of the above described types of clutches, which may be such as one of the above desired types of clutches, stopping all powertrain rotation from the second planet carrier 258 up to and including the electric motor/generator M/G1 232. The third axle shaft 244 may be connected between the differential 262 and the axle disconnect clutch 274.

While these devices have been described with reference to illustrative embodiments, it will be understood that this description shall not be construed in a limiting sense. Rather, various changes and modifications can be made to the illustrative embodiments without departing from the true spirit and scope of the invention, as defined by the following claims. Furthermore, it will be appreciated that any such changes and modifications would be recognized by those skilled in the art as an equivalent to one or more elements recited in the following claims, and shall be covered by such claims to the fullest extent permitted by law.

What is claimed is:

1. An axle assembly, comprising:
   at least one electric motor/generator connected to a rotatable first shaft with a first gear thereon;
   a second shaft with a second gear thereon, wherein said first gear on said rotatable first shaft and said second gear on said second shaft are meshingly engaged with each other to create a gear reduction pass;
   a first sun gear is located on an end portion of said second shaft opposite said second gear;
   a first gear on an intermediate portion of a first planet carrier is meshingly engaged with said first sun gear of said second shaft;
   a first ring gear is meshingly engaged with said first gear of said first planet carrier;
   wherein said first sun gear of said second shaft, said first planet carrier and said first ring gear form a first planetary gear set;
   a second planetary gear set connected between said first planetary gear set and a differential, wherein said second planetary gear set comprises a second ring gear directly drivingly connected to said differential, a second sun gear on an end portion of said first planet carrier, and a second planet carrier, wherein said second planet carrier is connected to an end portion of said first ring gear of said first planetary gear set and has one or more gears connected thereto, and wherein said one or more gears connected to said second planet carrier are meshingly engaged with said second ring gear of said second planetary gear set; and
   wherein a selector sleeve selectively connects a selector spline connected to said first ring gear and a ground for a low mode, wherein said selector sleeve selectively connects said first ring gear and said second planet carrier with said first planet carrier and said second sun gear for a high mode, and wherein said selector sleeve not connected for neutral.

2. The axle assembly of claim 1, wherein said second shaft is a hollow shaft and at least a portion of a third shaft is located within said hollow portion of said second shaft, wherein an end portion of said third shaft is driven by said differential, and wherein an end portion of said third shaft opposite said differential is drivingly connected to an axle disconnect clutch.

3. An axle assembly, comprising:
   at least one electric motor/generator connected to a rotatable first shaft with a first gear thereon;
   a second shaft having a second gear and a first sun gear, wherein said second gear of said second shaft is meshingly engaged with said first gear of said rotatable first shaft;
   a first planet carrier having one or more first gears and one or more second gears, wherein said one or more first gears of said first planet carrier are meshingly engaged with said first sun gear of said second shaft;
   a first ring gear meshingly engaged with said one or more first gears of said first planet carrier;
   a second sun gear connected to an end portion of said first ring gear, wherein said second sun gear is meshingly engaged with said one or more second gears of said first planet carrier; and
   a second ring gear meshingly engaged with said one or more second gears of said first planet carrier and drivingly connected to a differential.

4. The axle assembly of claim 3, further comprising a brake having a first portion and a second portion;
   wherein said first portion of said brake is connected to an intermediate portion of said first planet carrier; and
   wherein said second portion of said brake is a ground.

5. The axle assembly of claim 3, further comprising a clutch having a first portion and a second portion;
   wherein said first portion of said clutch is connected to an intermediate portion of said first ring gear; and
   wherein said second portion of said clutch is connected to an intermediate portion of said first planet carrier.

6. An axle assembly, comprising:
   at least one electric motor/generator connected to a rotatable first shaft with a first gear thereon;
   a second shaft having a second gear and a first sun gear, wherein said second gear of said second shaft is meshingly engaged with said first gear of said rotatable first shaft;
   a first planet carrier having one or more first gears and a second sun gear, wherein said one or more first gears of said first planet carrier are meshingly engaged with said first sun gear of said second shaft;
   a first ring gear meshingly engaged with said one or more first gears of said first planet carrier;
   a second ring gear connected to said first ring gear;

a second planet carrier having one or more gears, wherein said one or more gears of said second planet carrier are meshingly engaged with said second sun gear of said first planet carrier and said second ring gear; and a differential drivingly connected to at least a portion of said second planet carrier.

7. The axle assembly of claim 6, further comprising a brake having a first portion and a second portion;

wherein said first portion of said brake is connected to a portion connecting said first ring gear to said second ring gear; and wherein said second portion of said brake is a ground.

8. The axle assembly of claim 6, further comprising a clutch having a first portion and a second portion;

wherein said first portion of said clutch is connected to a portion connecting said first ring gear to said second ring gear; and wherein said second portion of said clutch is connected to an intermediate portion of said first planet carrier.

9. An axle assembly, comprising:

at least one electric motor/generator connected to a rotatable first shaft with a first gear thereon;

a second shaft having a second gear and a first sun gear, wherein said second gear of said second shaft is meshingly engaged with said first gear of said rotatable first shaft;

a first planet carrier having one or more first gears and a ring gear, wherein said one or more first gears of said first planet carrier are meshingly engaged with said first sun gear of said second shaft;

an additional ring gear meshingly engaged with said one or more first gears of said first planet carrier;

a second sun gear connected to an end portion of said additional ring gear;

a second planet carrier having one or more gears, wherein said one or more gears of said second planet carrier are meshingly engaged with said ring gear of said first planet carrier and said second sun gear of said additional ring gear;

a differential drivingly connected to at least a portion of said second planet carrier.

10. The axle assembly of claim 9, further comprising a brake having a first portion and a second portion;

wherein said first portion of said brake is connected to an intermediate portion of said first planet carrier; and wherein said second portion of said brake is a ground.

11. The axle assembly of claim 9, further comprising a clutch having a first portion and a second portion;

wherein said first portion of said clutch is connected to an intermediate portion of said first planet carrier; and wherein said second portion of said clutch is connected to a portion connecting said additional ring gear to said second sun gear.

12. A axle assembly, comprising:

at least one electric motor/generator connected to a rotatable first shaft with a first gear thereon;

a second shaft having a second gear and a first sun gear, wherein said second gear of said second shaft is meshingly engaged with said first gear of said rotatable first shaft;

a first planet carrier having one or more first gears and a second sun gear, wherein said one or more first gears of said first planet carrier are meshingly engaged with said first sun gear of said second shaft, wherein said one or more first gears and said second sun gear are connected to opposing end portions of said first planet carrier;

a first ring gear meshingly engaged with said one or more first gears of said first planet carrier;

a second planet carrier having one or more gears, wherein said one or more gears of said second planet carrier are meshingly engaged with said second sun gear of said first planet carrier, wherein said first ring gear and said one or more gears of said second planet carrier are connected to opposing end portions of said second planet carrier;

a second ring gear meshingly engaged with said one or more gears of said second planet carrier; and a differential drivingly connected to said second ring gear.

13. The axle assembly of claim 12, further comprising a brake having a first portion and a second portion;

wherein said first portion of said brake is connected to an intermediate portion of said second planet carrier; and wherein said second portion of said brake is a ground.

14. The axle assembly of claim 12, further comprising a clutch having a first portion and a second portion;

wherein said first portion of said clutch is connected to an intermediate portion of said first planet carrier; and wherein said second portion of said clutch is connected to an intermediate portion of said second planet carrier.

* * * * *